US012078224B2

(12) United States Patent
Thomas et al.

(10) Patent No.: US 12,078,224 B2
(45) Date of Patent: Sep. 3, 2024

(54) DEVICE FOR LOCKING AN OBJECT ALONG A CABLE (71) Applicant: THALES, Courbevoie (FR)

(72) Inventors: Philippe Thomas, Brest (FR); François Warnan, Brest (FR)

(73) Assignee: THALES, Courbevoie (FR)

( * ) Notice: Subject to any disclaimer, the term of this patent is extended or adjusted under 35 U.S.C. 154(b) by 497 days.

(21) Appl. No.: 17/618,452

(22) PCT Filed: Jun. 11, 2020

(86) PCT No.: PCT/EP2020/066162
§ 371 (c)(1),
(2) Date: Dec. 11, 2021

(87) PCT Pub. No.: WO2020/249655
PCT Pub. Date: Dec. 17, 2020

(65) Prior Publication Data
US 2022/0252135 A1 Aug. 11, 2022

(30) Foreign Application Priority Data
Jun. 13, 2019 (FR) ...................................... 1906285

(51) Int. Cl.
F16G 11/04 (2006.01)
B64D 1/02 (2006.01)
B66D 5/16 (2006.01)
G01S 7/521 (2006.01)

(52) U.S. Cl.
CPC ................ F16G 11/04 (2013.01); B66D 5/16 (2013.01); G01S 7/521 (2013.01); B64D 1/02 (2013.01)

(58) Field of Classification Search
CPC ......... F16G 11/04; F16G 11/048; B66D 5/16; B66D 1/60; G01S 7/521; B64D 1/02; B64D 7/00; B64D 1/22; G10K 11/006
See application file for complete search history.

(56) References Cited

U.S. PATENT DOCUMENTS

| 6,525,992 B1 * | 2/2003 | Olivier ..................... H04B 3/44 367/17 |
| 2014/0264209 A1 | 9/2014 | Lin |
| 2022/0252135 A1 * | 8/2022 | Thomas .................. F16G 11/04 |

FOREIGN PATENT DOCUMENTS

| AU | 2020290763 A1 * | 2/2022 | ............... B66D 1/60 |
| AU | 2020293482 A1 * | 2/2022 | ............... B64D 1/22 |
| CA | 3143347 A1 * | 12/2020 | ............... B66D 1/60 |
| DE | 44 25 157 A1 | 1/1996 | |
| DE | 4425157 A1 * | 1/1996 | ............. B62K 23/06 |
| EP | 3983697 A1 * | 4/2022 | ............... B66D 1/60 |

(Continued)

Primary Examiner — Daniel Pihulic
(74) Attorney, Agent, or Firm — BakerHostetler (57) ABSTRACT A locking device for locking an object capable of sliding along a cable, the device includes the cable and a clamp, the cable passing through the clamp while extending along an axis, the clamp comprising: a fixed part connected to the object, a ring comprising an elastic material with fluid behavior, the ring comprising a central cavity through which the cable passes, an actuator configured to compress the ring between two shapes, in a first shape, referred to as the open shape, the cable being able to run freely in the central cavity and in a second shape, referred to as the closed shape, the cable being compressed by the ring.

14 Claims, 5 Drawing Sheets (56) References Cited

FOREIGN PATENT DOCUMENTS

| EP | 3983698 A1 | * | 4/2022 | ............... B64D 1/22 |
|---|---|---|---|---|
| ES | 2955804 T3 | * | 12/2023 | ............... B64D 1/22 |
| FR | 1 287 517 A | | 3/1962 | |
| FR | 3097286 A1 | * | 12/2020 | ............... B66D 1/60 |
| FR | 3097287 A1 | * | 12/2020 | ............... B64D 1/22 |
| FR | 3097286 B1 | * | 12/2022 | ............... B66D 1/60 |
| FR | 3097287 B1 | * | 12/2022 | ............... B64D 1/22 |
| WO | 91/02179 A1 | | 2/1991 | |
| WO | 96/21114 A1 | | 7/1996 | |
| WO | 2015/092066 A1 | | 6/2015 | |
| WO | WO-2020249334 A1 | * | 12/2020 | ............. G01S 15/88 |
| WO | WO-2020249655 A1 | * | 12/2020 | ............... B66D 1/60 |
| WO | WO-2020249656 A1 | * | 12/2020 | ............... B64D 1/22 |

* cited by examiner

DEVICE FOR LOCKING AN OBJECT ALONG A CABLE

CROSS-REFERENCE TO RELATED APPLICATIONS

This application is a National Stage of International patent application PCT/EP2020/066162, filed on Jun. 11, 2020, which claims priority to foreign French patent application No. FR 1906285, filed on Jun. 13, 2019, the disclosures of which are incorporated by reference in their entirety.

The present invention relates to a locking device for locking an object along a cable. The invention allows the object to be positioned at different positions along the cable. The invention proves to be particularly useful in the field of sonar detection and, more specifically, for an airborne sonar often referred to as "dipping sonar". This particular field consists in immersing a sonar antenna at a desired depth from a helicopter or a drone.

BACKGROUND

In the context of anti-submarine warfare, in order to be able to detect submerged submarines in a given region, sonars, in particular active sonars, are generally employed. In this context, the deployment of sonars from airborne platforms (helicopters or drones) has proven to be especially effective, as such platforms are highly mobile with respect to submarines.

More precisely, helicopters are used to deploy sonar transmitters and receivers that are linked by a cable to their platform (in other words the helicopter). These are then referred to as "dipping sonars". Below, the submerged cable-linked sub-assembly is called an antenna. It comprises the actual sonar transmitters and receivers, and potentially electronic equipment associated with the transmitters and receivers. It may also comprise environmental sensors.

More generally, the invention is concerned with any object that is to be moved and immobilized along a cable, the cable being attached to a fixed point, for example to a carrier. The cable may extend in any direction. In particular, the cable may extend horizontally and the object may be suspended from the cable under the effect of gravity. The object may move in any medium, notably through the air or through the water.

Returning to the subject of dipping sonars, as known, a winch located inside the helicopter is used to drop the antenna into the water from the platform, to control the depth of the antenna in the water and to recover the antenna. The cable is fixed to the antenna and the depth of immersion is adjusted from the helicopter by hauling in or paying out the cable.

When lowering and raising the antenna by means of the winch, the cable generates significant drag in the water. This drag increases with the depth reached by the antenna, because of the length of paid-out cable. The speed at which the antenna is lowered and raised is thus limited by the drag generated by the movement of the cable. The larger the depth, the slower the speed at which the antenna must be lowered, because the antenna is drawn downward only by its weight minus its own drag and the drag of the cable. When the antenna is raised, the winch must exert, on the cable, a force equal to the weight of the antenna plus the overall drag. A winch capable of handling a substantial drag might be used. The cable has to be dimensioned to withstand the tensile force exerted by the winch. The higher this force, the larger the cross-sectional area of the cable must be, this further tending to increase drag.

In order to limit the drag of the cable in its movements through the water, the applicant company has explored the possibility of situating the winch inside the antenna. There then arises the problem of locking the position of the antenna along the cable. The winch positioned inside the antenna can easily perform this function by means of a brake able to block the winch actuator. The use of the winch actuator for locking the position of the antenna along the cable may prove complicated to implement and it may be preferable to separate the locking of the position of the antenna along the cable from the winch actuator.

SUMMARY OF THE INVENTION

To this end, the invention proposes a clamp that is very simple to implement. When the clamp is in an open position, the cable passes through it. When the clamp is in a closed position, this clamp blocks the running of the cable.

More specifically, the invention relates to a locking device for locking an object capable of sliding along a cable, the device comprising the cable and a clamp, the cable passing through the clamp while extending along an axis, the clamp comprising: a fixed part connected to the object by a connection having at least one degree of freedom in translational movement along the axis, a ring comprising an elastic material with fluid behavior, the ring comprising a central cavity through which the cable passes, an actuator configured to compress the ring between two shapes, in a first shape, referred to as the open shape, the cable being able to run freely in the central cavity and in a second shape, referred to as the closed shape, the cable being compressed by the ring.

The fixed part of the clamp is advantageously connected to the object by means of at least one elastic element.

The elastic element is advantageously configured to allow flexibility of the fixed part with respect to the object in translational movement along the axis and also in other degrees of freedom.

The elastic element is advantageously configured to convert the majority of the kinetic energy of the object into potential energy in the deformation of the spring.

The elastic element advantageously has damping properties able to dissipate the potential energy derived from the kinetic energy of the object.

The actuator applies to the ring a force advantageously directed along the axis of the cable.

The device may comprise a rigid annulus secured to the fixed part and through which the cable passes, the ring bearing against one face of the annulus, the face being perpendicular to the axis of the cable, the ring being compressed between the annulus and the actuator.

The face of the annulus is referred to as the first face. The annulus has a second face opposite the first face. The second face is advantageously chamfered around a hole in the annulus through which hole the cable passes.

Advantageously, the actuator moves the ring along the axis of the cable in the direction toward the annulus in order to achieve the closed shape and in the direction away from the annulus in order to achieve the open shape.

The actuator advantageously comprises a screw-nut system of which a fixed part is secured to the fixed part of the clamp and of which a moving part is configured to compress the ring.

The locking device advantageously comprises a rigid tube extending along the axis of the cable, the ring being situated inside the tube, the tube being able to limit the expansion of the ring radially about the axis of the cable.

The tube is advantageously secured to the annulus.

The annulus is referred to as the first annulus. The device advantageously comprises a second annulus through which the cable passes and which is interposed between the actuator and the ring.

The two annuli have holes centered about the axis and through which the cable passes. In its open shape, the central cavity advantageously has a cross section perpendicular to the axis that is constant along the axis, the cross sections of the holes advantageously having dimensions smaller than those of the cross section of the central cavity.

BRIEF DESCRIPTION OF THE DRAWINGS

The invention will be better understood and further advantages will become apparent from reading the detailed description of one embodiment provided by way of example, which description is illustrated by the attached drawing, in which.

For the sake of clarity, elements that are the same have been designated with the same references in the various figures.

DETAILED DESCRIPTION

The detailed description of the invention is given in connection with a dipping sonar and more specifically a sonar antenna hanging from a cable fixed to a carrier. The invention is not limited to a sonar and can be employed for any object capable of sliding along the cable and of which the position with respect to the cable is to be locked.

Figure 1A:
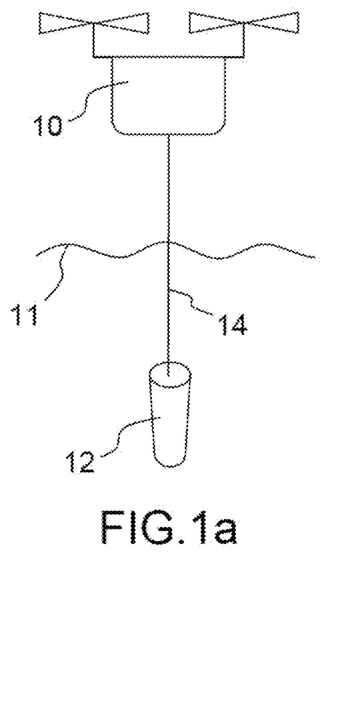
FIGS. 1a and 1b show various carriers each equipped with one dipping sonar.
Figure 1B:
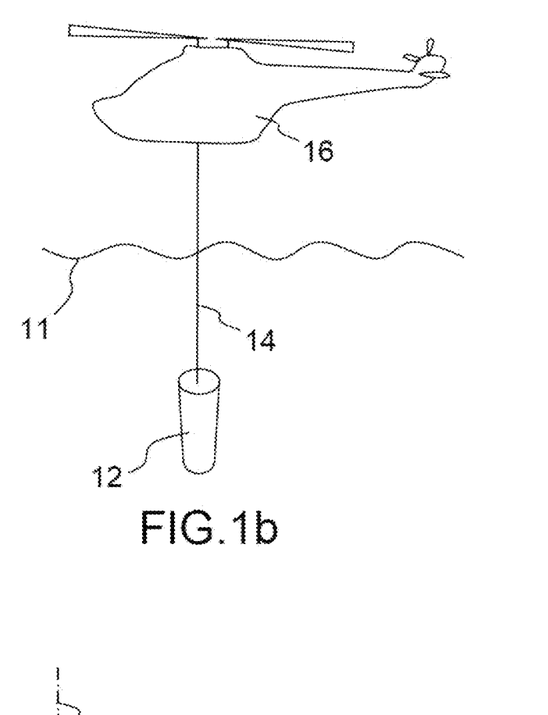

FIG. 1a shows a drone 10 hovering above water, the surface of which has been given the reference number 11. The drone 10 is equipped with an active dipping sonar comprising an antenna 12 attached to the drone 10 by a cable 14. This type of sonar in particular allows submarine objects to be detected and classified. FIG. 1b shows a helicopter 16 also equipped with an active dipping sonar comprising the antenna 12 attached to the helicopter 16 by the cable 14. Any type of carrier capable of positioning itself above the water may be equipped with an active dipping sonar. The carrier is able to lower the antenna to a desired depth under water, to conduct an acoustic detection phase, and to raise the antenna in order to terminate its mission or in order to carry out other missions.

Figure 2:
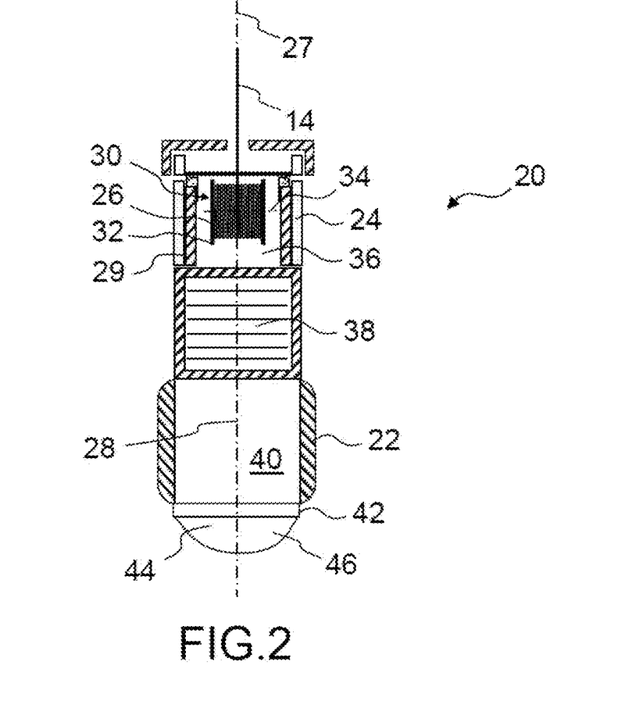
FIG. 2 shows a first variant embodiment of an antenna of the dipping sonar of FIGS. 1a and 1b.

FIG. 2 shows a first variant embodiment of an antenna 20 of an active dipping sonar. The antenna 20 is equipped with acoustic transmitters 22, acoustic receivers 24 and a motorized winch 26. The winch 26 is used to haul in and pay out the cable 14. A free end 27 of the cable 14 allows the antenna 20 to be attached to the carrier, such as the drone 10 or the helicopter 16. The antenna 20 extends along an axis 28 that is vertical when the antenna 20 is hanging from the cable 14 and is only subjected to gravity. The antenna 20 has a shape that is substantially of revolution about the axis 28. The acoustic transmitters 22 and the acoustic receivers 24 are placed radially around the axis 28.

The acoustic transmitters 22 and the acoustic receivers 24 may be fastened to a casing 29 of the antenna 20. The acoustic transmitters 22 and the acoustic receivers 24 may be placed in separate regions of the antenna 20, the regions being superposed on each other as shown in FIG. 2. Alternatively, the regions may be interspersed, as for example described in the patent application published under No. WO2015/092066 and filed in the name of the applicant.

The winch 26 is motorized by means of an actuator 30. More precisely, the actuator 30 allows a reel 32 on which the cable 14 is wound to be rotated. The actuator 30 may be an electric or hydraulic motor, or more generally a motor employing any form of energy able to operate in a confined space without air renewal. It is advantageously located inside the reel 32 in order to free up space in the antenna 20. The cable 14, as regards its paid-out portion, extends along the vertical axis 28. The antenna 20 hangs under the effect of gravity. In FIG. 2, the reel 32 rotates around a horizontal axis 34. Alternatively, the cable 14 may be wound around a reel with a vertical axis. A reeling mechanism allows the cable 14 to be stowed neatly on the reel 32. The reeling mechanism makes a cable guide perform a back-and-forth translational movement along the axis of the reel, in order to stow the cable 14 neatly in successive layers on the reel 32. In the case of a vertical-axis reel, the reel may remain stationary, and the reeling mechanism then rotates around the reel in addition to making its translational movement. Such mechanisms in particular exist in fishing reels. Alternatively, the reel may rotate about its axis and the guide of the reeling mechanism move only translationally with respect to a casing 29 of the antenna 20.

The winch 26 formed from the reel 32 and from the actuator 30 is placed inside the antenna 20, for example in an internal volume 36 located between the acoustic receivers 24.

The antenna 20 also comprises electronic modules 38 in particular allowing the acoustic signals transmitted by the transmitters 22 to be generated, the acoustic signals received by the receivers 24 to be processed, and the actuator 30 to be driven.

The electrical power necessary for the operation of all the components of the antenna 20 may come from the carrier and be delivered via the cable 14. However, this solution requires the cross-sectional area of the cable 14 to be increased in order to be capable of delivering all of the power required. In particular, the acoustic transmitters need to be supplied with a high instantaneous power, which may be of the order of several kilowatts. Since the cable 14 may be more than several hundred meters in length, it is then necessary to provide a cable the cross-sectional area of which is large enough to limit the effects of ohmic losses along the cable 14. This tends to increase the dimensions of the reel 32, which must be able to accommodate almost all of the length of the cable 14. In addition, during acoustic transmission phases, the transmission of data through the cable must be interrupted to prevent any corruption of the data by the transmission of power through the cable 14.

To limit periods of high power transfer through the cable 14, it is advantageous for the antenna 20 to be equipped with a battery 40, which is advantageously placed in a lower portion of the antenna 20, or at the very least below the volume 36 containing the winch 26, in order to allow the antenna to preserve a better vertical orientation, in particular during lowering when it is hanging by the cable 14. The battery 40 may be intended to smooth the transfer of electrical power through the cable 14, this making it possible to decrease the cross-sectional area of the electrical conductors of the cable 14. To this end, the battery 40 may supply power to the acoustic transmitters 22 which, conventionally, transmit at high power for a small fraction of the duration of a mission. It is also advantageous to completely dispense with power transfer through the cable 14. The battery 40 then supplies power to all the electrical loads of the antenna, such as in particular the winch 26, the electronic modules 38, and the acoustic transmitters 22 and receivers 24. To recharge the battery 40, the antenna comprises recharging means that are independent of the cable 14, such as for example a specific connector or a recharging region 42 that is contactless, and for example inductive. The battery 40 may be recharged on board the carrier 10 or 16 by connecting the specific connector or by placing the region 42 near a dedicated inductor.

The antenna 20 may also comprise environmental sensors such as a sounder 44 allowing the distance from the antenna 20 to the seabed to be determined, and a temperature sensor 46 allowing the variation in the temperature of the water as a function of the depth reached by the antenna 20 to be measured. Specifically, the propagation of sound waves in water depends on the variation in the temperature of the water. These sensors may also be powered by the battery 40.

Figure 3A:
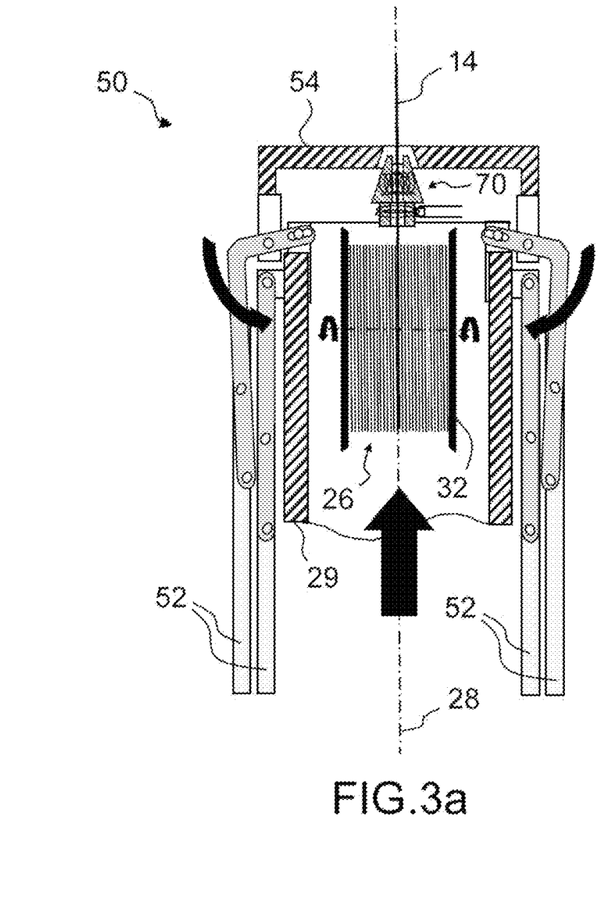
FIGS. 3a and 3b show a second variant embodiment of an antenna of the dipping sonar of FIGS. 1a and 1b.
Figure 3B:
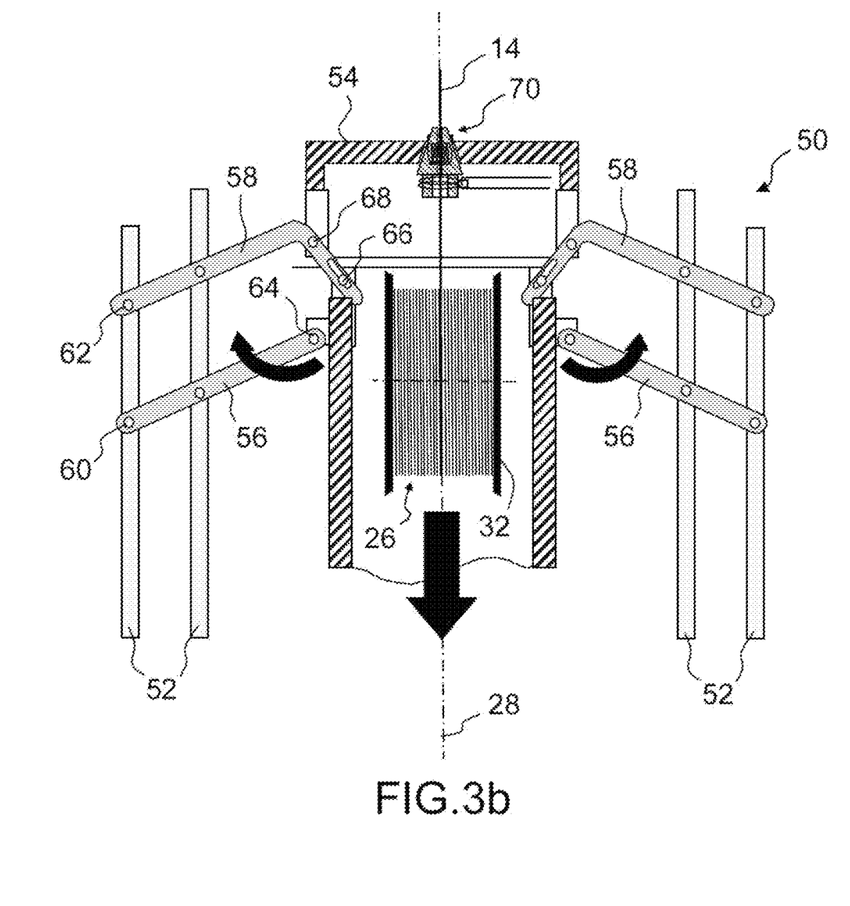

FIGS. 3a and 3b show a second variant embodiment of the antenna 50 of an active dipping sonar according to the invention. In this variant, during sonar reception, the acoustic receivers 24, which are possibly placed on arms, are deployed away from the casing 29 of the antenna 50. In contrast, during operation of the winch 26, the acoustic receivers 24 are stowed against the casing 29 in order to limit the drag of the antenna 50 while the antenna 50 is being lowered and raised in the water. This type of deployable antenna has already been developed by the applicant. In this type of antenna, the acoustic receivers are deployed by means of an electromechanical mechanism placed in the antenna. This mechanism comprises an electric motor that moves arms bearing the acoustic receivers. The motor is actuated both to deploy and to retract the arms. This mechanism is heavy and bulky.

It is possible to keep in the antenna such an electromechanical mechanism for moving arms bearing the acoustic receivers 24. Alternatively, the second variant allows this mechanism to be dispensed with.

The antenna 50 comprises deployable arms 52 on which the acoustic receivers 24 are placed. The arms 52 are advantageously regularly distributed around the axis 28, in order to ensure complete acoustic detection around the axis 28. FIG. 3a partially shows the antenna 50, in which the arms 52 are folded against the casing 29. FIG. 3b also partially shows the antenna 50, in which the arms 52 are deployed away from the casing 29. The arms 52 are hinged with respect to the casing 29 and with respect to a body 54 forming an annulus-shaped cover that is able to move translationally with respect to the casing 29 along the axis 28. The body 54 is for example of revolution about the axis 28 and the cable 14 passes through the body 54 via the hole in the annulus.

This two-hinge approach allows the arms 52 to move away from or come closer to the casing 29 during the movement of the body 54. More precisely, in the position of the body 54 shown in FIG. 3a the arms 52 are folded against the casing 29, and in the position of the body 54 shown in FIG. 3b the arms 52 are deployed away from the casing 29.

The arms 52 may be hinged directly to the casing 29 and to the body 54 by means of pivot links. Once deployed, the arms 52 lie horizontal or are inclined with respect to the axis 28. The dynamics of this type of mechanism are very simple. These dynamics are employed in particular in sonar buoys, in which the carrier floats on the surface of the water. However, this orientation of the arms may degrade the acoustic detection when the carrier is a drone or a helicopter. Specifically, in this orientation, the acoustic receivers 24 are affected by the noise generated by the carrier. It may therefore be preferable to make provision for the arms 52 to have a vertical orientation when they are deployed. In other words, it may be desirable to keep the arms parallel to the axis 28 during the translational movement of the body 54. To do this, the arms 52 may be hinged by way of a four-bar deformable-parallelogram linkage. More precisely, two bars 56 and 58 having parallel segments are hinged on the one hand to an arm 52, by means of links 60 and 62, respectively, and on the other hand to the casing 29, by means of links 64 and 66, respectively. One of the bars, the bar 58 in the example shown, is hinged to the body 54, by means of the link 68, at a point located away from the point where the bar is hinged to the arm 52, and away from the point where the bar is hinged to the casing 29. Thus, when the body 54 moves translationally, the bar 58 pivots about its hinge to the casing 29 and drives the arm 52. The bar 56 is driven by the arm 52 and also pivots with respect to the casing 29. During this movement, the orientation of the arm 52 with respect to the casing 29 does not vary. In the example shown, the arm 52 remains parallel to the axis 29. As shown, it is possible to hinge a plurality of arms 52, two in the example shown, to the same two bars 56 and 58. More precisely, each of the two arms 52 is hinged to the bar 58 and to the bar 56. As specified above, the antenna 50 may be equipped with a plurality of arms 52 distributed around the axis 28. To bear these various arms 52, the antenna 50 is equipped with a plurality of series of two bars 56 and 58 that are also distributed radially around the axis 28.

The translational movement of the body 54 with respect to the casing 29 may be achieved by means of an electromechanical actuator that ensures this movement directly. The actuator is for example formed from a linear hydraulic cylinder the body of which is fastened to the casing 29 and the rod of which, which moves translationally with respect to the body of the hydraulic cylinder, is fastened to the body 54. The inverse configuration is also possible.

Advantageously, it is possible to dispense with an actuator between the casing 29 and the body 54, by using the forces due to gravity exerted on the casing 29 and on the body 54. Specifically, the casing 29 may contain heavy components of which advantage may be taken to deploy the arms 52. To do this, the body 54 is equipped with a clamp 70 that is configured to clamp the cable 14 and to immobilize it with respect to the body 54.

When the clamp 70 is in the open position, the cable 14 is free with respect to the body 54 and its weight, associated with that of the arms 52 via the hinge 68, drives the body 54 downward, i.e. toward the casing 29. In this position, the arms 52 are also driven downward, i.e. to the position folded against the casing 29. This clamp-open position is shown in FIG. 3a.

When the clamp 70 is in the closed position, the cable 14 is immobilized with respect to the body 54. In this position, it is possible to activate the winch 26 so as to pay out the cable and thus allow the casing 29 and the equipment fastened thereto to be lowered with respect to the body 54 under the effect of gravity. This relative movement of the body 54 with respect to the casing 29 causes the arms 52 to be deployed to the position shown in FIG. 3*b*. This is possible if the arms 52, and where appropriate the bars 56 and 58, are lighter than the casing 29 and all the components that are fastened thereto. This condition is generally easily met due to the presence of heavy components, in particular the battery 40 and the winch 26, in the casing 29. The activation of the winch 26 with a view to paying out the cable 14 after the clamp 70 has been closed is carried out in a manner that is coordinated with the relative movement of the body 54 with respect to the casing 29. More precisely, the length of cable paid out is substantially equal to the length of the translational movement of the body 54 with respect to the casing 29. Paying out a longer length of cable would run the risk of causing the presence of slack cable between the reel 32 and the clamp 70. Paying out a shorter length of cable would not allow the arms 52 to be completely deployed. It is possible to control the deployment of the arms 52 by activating the winch 26.

The clamp 70 may be used with the antenna 20 described in FIG. 2, which is to say without deployable arms.

Figure 4A:
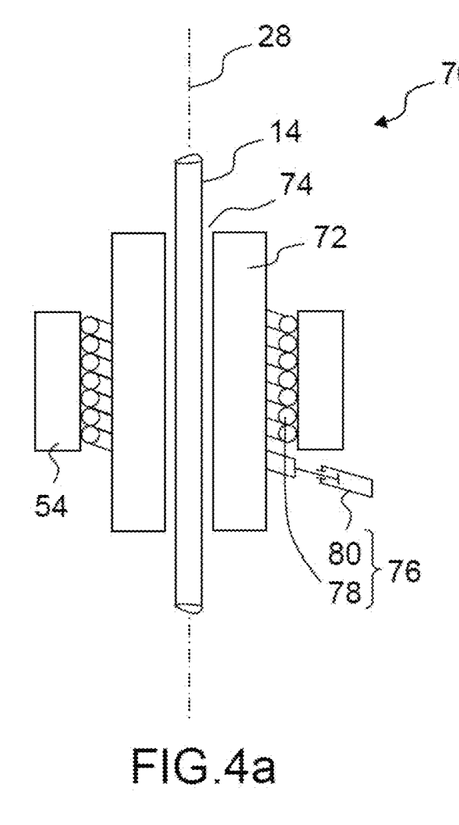
FIGS. 4a and 4b describe a first variant embodiment of a clamp enabling the locking of the position of the sonar antenna along a cable.
Figure 4B:
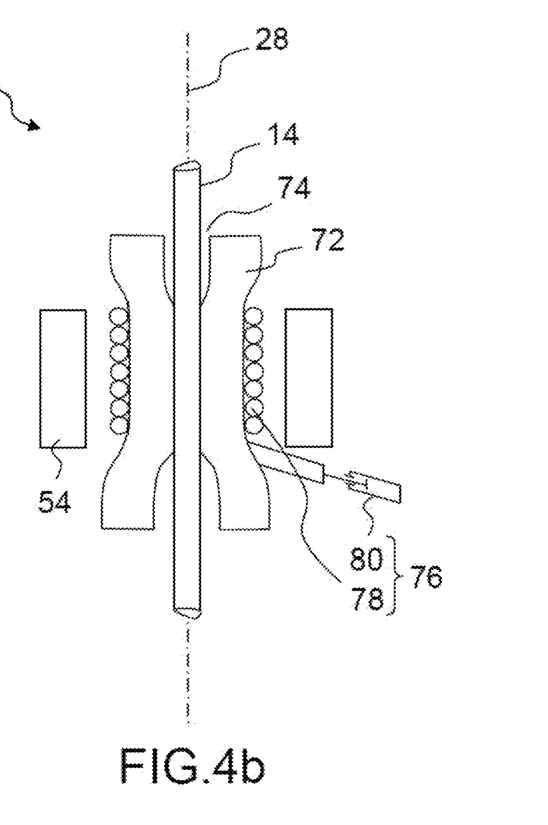

FIGS. 4*a* and 4*b* show a first variant embodiment of the clamp 70 forming a locking device for locking the antenna 20 or 50 along the cable 14. As indicated above, the invention may be implemented for any object capable of sliding along a cable passing through the clamp 70 and of which the position with respect to the cable 14 is to be locked. The clamp 70 can be implemented for any orientation of the cable 14. It is not necessary for the cable 14 to remain vertical in order for the clamp 70 to be implemented.

The clamp 70 comprises a fixed part which may form part of the body 54 or may be attached to the body 54 and secured thereto. As indicated above, the clamp 70 can be implemented in the antenna 20. The fixed part of the clamp is then securely fastened to the casing 29. To simplify the remainder of the description, the body 54 is considered to be the fixed part of the clamp 70. The clamp 70 further comprises a ring 72 comprising an elastic material with fluid behavior. This may be a one-piece material for example based on rubber or on silicone. Alternatively, the ring 72 may comprise an elastic envelope containing a fluid. The one-piece material allows use of a near-solid material which holds its shape when no mechanical stress is applied to the material. Use of an envelope allows use of a material that is far more fluid, for example liquid. The envelope may provide the elastic behavior of the ring 72. With or without an envelope, in the absence of mechanical stress, the ring 72 has a solid shape surrounding a central cavity 74 through which the cable 14 passes.

The clamp 70 also comprises an actuator 76 configured to compress the ring 72 between two shapes. A first shape, referred to as the open shape, is shown in FIG. 4*a*. The first shape provides the clamp-open position of the clamp 70. In this first shape of the ring 72, the actuator 76 does not compress the ring 72 which maintains its natural shape in which the cable 14 can run freely in the central cavity 74. Alternatively, when the ring 72 is in the first shape, the actuator 76 may already be applying a preload to the ring 72, for example for holding the ring 72 in place. Even in the presence of this preload, the cable 14 can run freely in the central cavity 74.

When the ring 72 is in a second shape, referred to as the closed shape and shown in FIG. 4*b*, the cable 14 is compressed by the ring 72. In other words, the central cavity 74 closes up under the effect of the actuator 76 to the point of compressing the cable 14 and preventing it from running in the clamp 70. The position of the body 54 and therefore of the antenna is thus locked. The second shape provides the clamp-closed position of the clamp 70.

The presence in the ring 72 of a material exhibiting a fluid behavior allows the central cavity 74 to conform perfectly to the shape of the cable 14 over the entirety of its exterior surface held by the clamp 70. Such a clamp is able to adapt to suit a cable that is irregular over its length. The irregularities may have all kinds of underlying causes. They may be unintentional and due, for example, to manufacturing imperfections, or to deformations caused during the course of the use of the antenna. The imperfections may be intentional and defined during the design of the cable.

The clamp 70, and particularly the ring 72 and the actuator 76, are configured so that the ring 72 maintains its elastic behavior, which is to say does not adopt a permanent deformation, between its two shapes. More specifically, starting from the closed shape, when the actuator 76 relaxes its compression, the elastic behavior of the ring 72 allows it to regain its open shape.

In the variant shown in FIGS. 4*a* and 4*b*, the actuator 76 applies a radial force to the ring 72 in the direction of the axis 28 in order to cause the ring 72 to pass from its first shape of FIG. 4*a* to its second shape of FIG. 4*b*.

In order to apply a radial force to the ring 72, in the variant of FIGS. 4*a* and 4*b*, the actuator 76 comprises, for example, a helical spring 78 extending along the axis 28 and fixed at one of its ends. A motor or a hydraulic cylinder 80 is configured to pull on the second end of the spring 78 in order to tighten it around the axis 28.

Figure 5A:
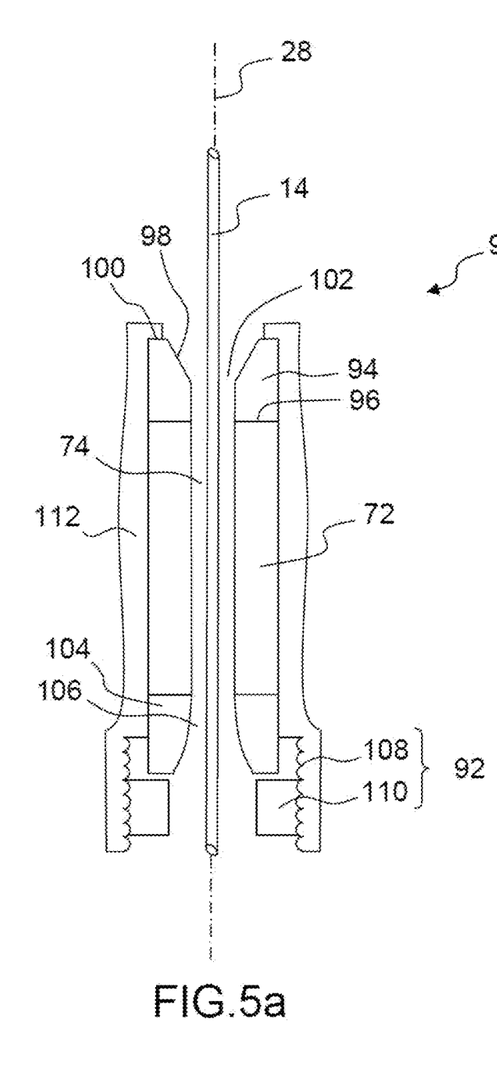
FIGS. 5a and 5b describe a second variant embodiment of the clamp.
Figure 5B:
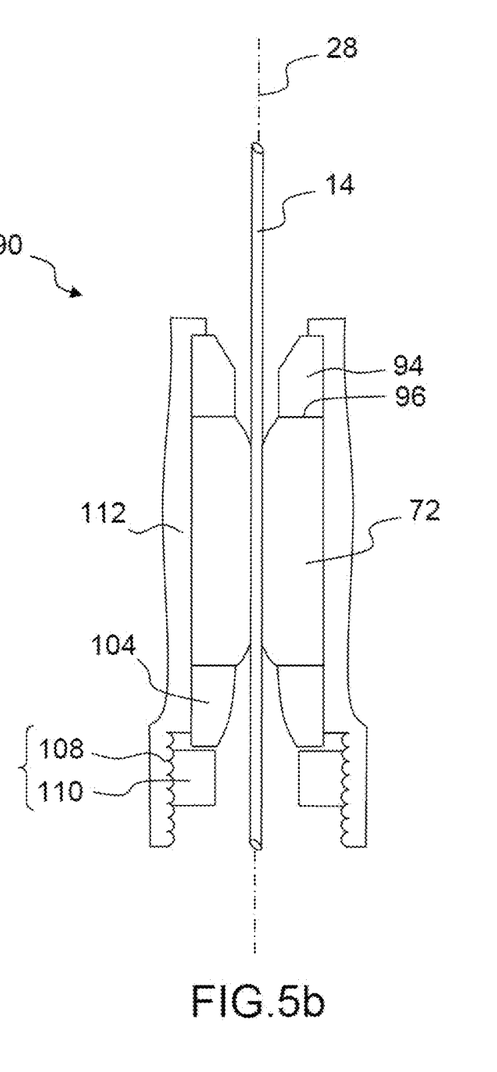

FIGS. 5*a* and 5*b* show a second variant embodiment of the clamp, here bearing the reference numeral 90. This variant again has the ring 72 able to adopt its two shapes, the open shape, shown in FIG. 5*a* and which allows the cable 14 to run freely through the clamp 90, and the closed shape, shown in FIG. 5*b* and which compresses the cable 14, preventing it from running in the clamp 90. Unlike the clamp 70, the clamp 90 comprises an actuator 92 exerting an axial force, along the axis 28, on the ring 72 tending to reduce the length of the ring 72 along the axis 28 in order to achieve its closed shape. By relaxing the force applied by the actuator 92, because of the elasticity of the ring 72, its length increases and the ring 72 regains the open shape.

By employing a material that is substantially incompressible, such as rubber for example, which has a Poisson's ratio of around 0.5, the reduction in height of the ring 72 is converted fully into an increase in the cross section of the ring 72 perpendicular to the axis 28. This increase in cross section leads to a reduction in the cross section of the central cavity 74 and therefore to a compression of the cable 14. It is possible to employ materials which have a Poisson's ratio of less than 0.5. It is then necessary for the actuator 92 to generate a greater movement in order to obtain the same reduction in cross section of the central cavity 74 than is obtained with an incompressible material. In other words, the higher the Poisson's ratio, and therefore the closer it is to 0.5, the greater the effectiveness of the actuator 92.

The actuator 92 may apply its force on both ends of the ring 72. However, this arrangement for the actuator 92 may prove difficult to implement because of the height of the ring 72 along the axis 28. It is advantageous for the ring 72 to bear against the body 54 and for the actuator 92 to apply its force to the ring 72 at the opposite end from this end bearing against the body 54. In addition, it is advantageous for the pressure with which the ring 72 bears against the body 54 to be distributed about the axis 28 of the cable 14. To this end, the clamp 90 comprises a rigid annulus 94 secured to the body 54 and through which the cable 14 passes. The ring 72 bears against one face 96 of the annulus 94 perpendicular to the axis 28 of the cable 14. The ring 72 is compressed between the annulus 94 and the actuator 92.

The annulus 94 is able to guide the cable 14 as it enters the clamp 90. In order to do this, the annulus 94 has a chamfer 98 made in a face 100 of the annulus 94 which is the opposite face to the face 96. The chamfer 98 is produced around the hole 102 in the annulus 94. The hole 102 is used for the passing of the cable 14 through the annulus 94. The hole 102 and the central cavity 74 of the ring 72 are positioned one in the continuation of the other. More specifically, the hole 102 and the central cavity 74 are both concentric with the axis 28. In a plane perpendicular to the axis 28, the cross section of the central cavity 74 is constant over the entire height of the ring 72. The cross section of the hole 102 may have the same dimensions as those of the cross section of the central cavity 74 when the ring 72 is in the open shape shown in FIG. 5a.

In addition to guiding the cable 14, the annulus 94 may limit the friction of the cable 14 running in the central cavity 74 when the ring 72 is in its open shape. For this purpose, the cross section of the hole 102 has dimensions smaller than those of the cross section of the central cavity 74 in the open shape. Thus, when the ring 72 is in the open shape, the cable 14 will come into contact with the annulus 94 without touching the ring 72 in the vicinity of the annulus 94. The material selected for the annulus 94 may be a material that has a coefficient of friction against the cable 14 that is lower than the coefficient of friction between the ring 72 and the cable. For this purpose, the annulus 94 may for example be made of bronze.

It is advantageous for the pressure with which the actuator 92 bears against the ring 72 to be distributed about the axis 28 of the cable 14. For this purpose, the clamp 90 comprises a second annulus 104, capable of translational movement along the axis 28. The translational mobility of the annulus 104 allows the ring 72 to pass from its open shape to its closed shape and vice versa. The annulus 104 has a hole 106 through which the cable 14 passes. The annulus 104 may have the same shape as that of the annulus 94, notably including the chamfer thereof. The ring 72 is positioned between the annuli 94 and 104. The two annuli 94 and 104 are mounted in an opposed manner. The actuator 92 applies its force to the ring 72 via the annulus 104. By defining the cross sections of the holes 102 and 106 as both having dimensions smaller than those of the cross section of the central cavity 74 in its open shape, the cable 14, when taut, touches only the holes 102 and 106 and not the ring 72, thus eliminating any friction between the cable 14 and the ring 72 in its open shape. As was the case with the annulus 94, the material of the annulus 104 is chosen to limit friction forces on the cable 14.

The actuator 92 may adopt numerous forms such as, for example, that of a linear hydraulic cylinder applying its force to the annulus 104, where there is one, or directly to the ring 72, in the absence of an annulus 104. Alternatively, in order to simplify the clamp 90, the actuator 92 comprises a screw-nut system of which a fixed part is secured to the body 54 and of which a moving part is intended to compress the ring 72. The screw-nut system configuration depicted in FIGS. 5a and 5b provides for a screw-nut system that is nice and compact. More specifically, an internal thread 108 concentric with the axis 28 is tapped in the body 54. A screw 110 engages with the tapped thread 108, moves along the axis 28 and presses the annulus 104 toward the annulus 94 to cause the ring 72 to pass from the open shape to the closed shape, and moves in the opposite direction in order to return to the open shape. The screw 110 is holed along the axis 28 to allow the cable 14 to pass.

By compressing the ring 72 between the annulus 94 and the actuator 92, the cross section of the ring 72 increases, both reducing the dimensions of the central cavity 74 and increasing the dimensions of the external cross section of the ring 72, which deforms into a barrel shape. The reduction in the cross section of the central cavity is beneficial for compressing the cable 14. However, the swelling of the outside of the ring 72 is of no benefit in gripping the cable 14. It is advantageous to avoid this swelling by placing the ring 72 inside a rigid tube 112 that limits the expansion of the ring 72 radially about the axis 28. The tube 112 has an internal cross section of which the dimensions are the same, give or take the functional clearances, as the dimensions of the external cross section of the ring 72 in its open shape. The tube 112 may be mounted freely with respect to the body 54 and held in place on the ring 72 by adhesion. Alternatively, the tube 112 may be secured to the body 54 or even bored directly in the body 54. Thus, the body 54 fulfills a number of functions: it provides a bearing surface for the annulus 94, the tube 112 and the tapped thread 108. In order to limit the number of distinct mechanical parts that make up the clamp 90, the annulus 94 may be produced directly in the body 54.

In the two variants, the clamp comprises a single actuator, 76 and 92 respectively, for compressing the ring 72. It is equally possible to employ a number of actuators, possibly mutually independent actuators.

In FIGS. 4a and 4b, the body 54 forms the fixed part of the clamp 70. Likewise, in FIGS. 5a and 5b, the tube 112 forms the fixed part of the clamp 90. The fixed part of the clamp may be securely fastened to the antenna 20 or 50. Alternatively, the fixed part of the clamp may float relative to the antenna 20 or 50. When the clamp is in the open position, the fixed part may maintain at least a degree of freedom of translational movement along the axis 28 with respect to the antenna 20 or 50. This degree of freedom facilitates closure of the clamp 70 or 90 when the antenna is being lowered or raised. This degree of freedom allows the friction between the ring 72 and the cable 14 during closure of the clamp to be limited.

Figure 6A:
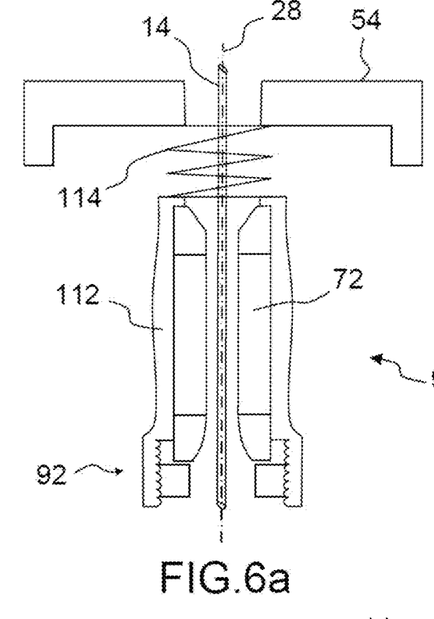
FIGS. 6a, 6b and 6c illustrate a variant of the clamp.
Figure 6B:
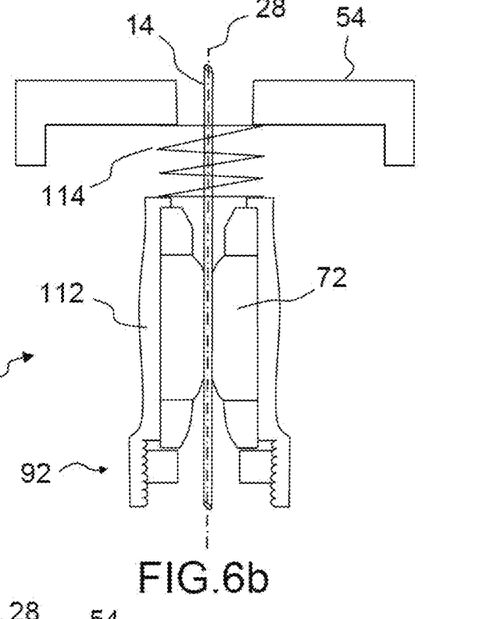
Figure 6C:
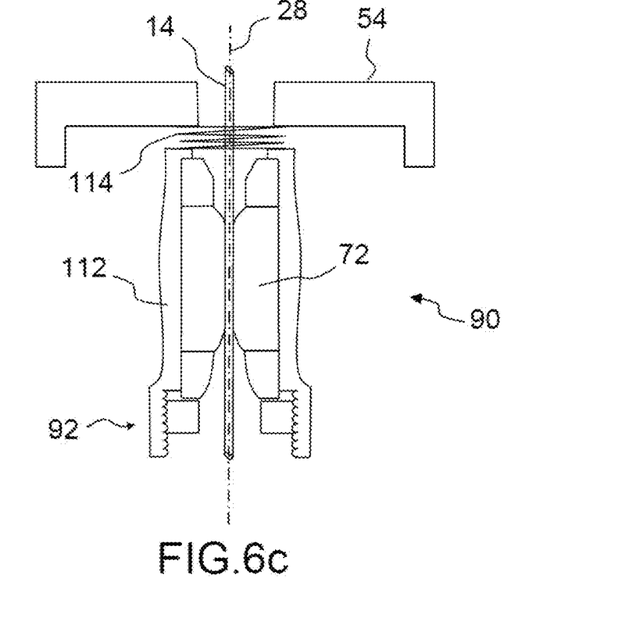

More specifically, in FIGS. 6a, 6b and 6c, the tube 112 is connected to the body 54 while allowing a translational movement along the axis 28 between the body 54 and the tube 112. A spring 114 connects the tube 112 to the body 54. The spring 114 may compress, bringing the tube 112 closer to the body 54. In FIG. 6a, the clamp 90 is in the open position. The tube 112 is situated below the body 54 some distance from the body 54. The cable 14 can run freely in the central cavity 74 of the ring 72. FIG. 6b depicts the start of closure of the clamp 90. More specifically, the actuator 92 compresses the ring 72 to bring it to press against the cable 14. At the start of clamping, the spring 114 remains still relaxed as in FIG. 6a. Thereafter, as depicted in FIG. 6c, gravity acts on the body 54 and the spring 114 becomes compressed, bringing the tube 112 into abutment against the body 54. In other words, in the position of FIG. 6c, the degree of freedom of the clamp 90 to move translationally relative to the body 54 along the axis 28 is eliminated.

The spring 114 allows flexibility of the tube 112 with respect to the body 54 in translational movement along the axis 28 and also in other degrees of freedom. This may improve the centering of the cable 14 as it passes through the clamp 90. In other words, aside from the degree of freedom to effect a translational movement along the axis 28, the other degrees of freedom may offer an advantage. As an alternative to the presence of the spring 114, any other slideway along the axis 28 that allows the tube 112 a translational movement with respect to the body 54 may be employed. This translational movement allows the slipping of the cable 14 in the central cavity 74 of the ring 72 during closure of the clamp 90 to be limited. More precisely, it may be desirable to clamp the clamp 90 while the antenna is being lowered. With a clamp 90 of which the fixed part, in this instance the tube 112, is secured to the body 54 during the clamping of the clamp 90, the antenna loses speed and the clamp 90 acts as a brake, rubbing against the cable 14. All of the kinetic energy of the antenna is dissipated by this friction, leading to wearing of the cable 14 and of the ring 72. By contrast, when the clamp 90 has a degree of freedom in translational movement along the axis 28 with respect to the body 54, only the kinetic energy due to the mass of the clamp is dissipated by friction against the cable 14. Because the clamp 90 has a mass very much lower than that of the entirety of the antenna, and at most, less than half the mass of the antenna, the majority of the kinetic energy of the antenna is converted into potential energy in the compression of the spring 114, which then limits the energy dissipated by friction between the ring 72 and the cable 14 and therefore the wearing of this ring and this cable. The compression of the spring 114 in order to limit the friction on the cable works both when lowering and when raising the antenna 50. In the example depicted in FIGS. 6a, 6b and 6c, the spring 114 becomes compressed as the clamp 90 is clamped. Alternatively, it is possible to conceive of a spring that becomes tensioned as the clamp 90 is clamped. The bottom of the tube 112 is then fixed to a spring which is itself fixed to the body 54, this time situated below the tube 112. It is also possible to position the tube 112 between two springs, each of them fixed on the one hand to the tube 112 and on the other hand to the body 54.

The spring 114 may be replaced by other types of elastic elements such as elastomers. The elastic element may have damping properties able to dissipate the potential energy derived from the kinetic energy of the clamp. For example, it is possible to employ a damper in place of or in addition to the spring 114. Certain elastomers also offer damping properties in addition to their elastic property.

The setup described using FIGS. 6a to 6c may of course be implemented in respect of the clamp 70 and, more generally, in respect of any clamp that falls within the scope of the invention.

The invention claimed is:

1. A locking device for locking an object capable of sliding along a cable, the device comprising the cable and a clamp, the cable passing through the clamp while extending along an axis, the clamp comprising: a fixed part connected to the object by a connection having at least one degree of freedom in translational movement along the axis, a ring comprising an elastic material with fluid behavior, the ring comprising a central cavity through which the cable passes, an actuator configured to compress the ring between two shapes, in a first shape, referred to as the open shape, the cable being able to run freely in the central cavity and in a second shape, referred to as the closed shape, the cable being compressed by the ring.

2. The locking device as claimed in claim 1, wherein the fixed part of the clamp is connected to the object by means of at least one elastic element.

3. The locking device as claimed in claim 2, wherein the elastic element is configured to allow flexibility of the fixed part with respect to the object in translational movement along the axis and also in other degrees of freedom.

4. The locking device as claimed in claim 2, wherein the elastic element is configured to convert the majority of the kinetic energy of the object into potential energy in the deformation of the elastic element.

5. The locking device as claimed in claim 2, wherein the elastic element has damping properties able to dissipate the potential energy derived from the kinetic energy of the object.

6. The locking device as claimed in claim 1, wherein the actuator applies to the ring an axial force along the axis of the cable.

7. The locking device as claimed in claim 6, comprising a rigid annulus secured to the fixed part and through which the cable passes, the ring bearing against one face of the annulus, the face being perpendicular to the axis of the cable, the ring being compressed between the annulus and the actuator.

8. The locking device as claimed in claim 7, wherein the face of the annulus is referred to as the first face, wherein the annulus has a second face opposite the first face, and wherein the second face is chamfered around a hole in the annulus through which hole the cable passes.

9. The locking device as claimed in claim 7, wherein the actuator moves the ring along the axis of the cable in the direction toward the annulus in order to achieve the closed shape and in the direction away from the annulus in order to achieve the open shape.

10. The locking device as claimed in claim 9, wherein the actuator comprises a screw-nut system of which a fixed part is secured to the fixed part of the clamp and of which a moving part is configured to compress the ring.

11. The locking device as claimed in claim 6, comprising a rigid tube extending along the axis of the cable, the ring being situated inside the tube, the tube being able to limit the expansion of the ring radially about the axis of the cable.

12. The locking device as claimed in claim 11, wherein the tube is secured to the annulus.

13. The locking device as claimed in claim 7, wherein the annulus is referred to as the first annulus, the device comprising a second annulus through which the cable passes and which is interposed between the actuator and the ring.

14. The locking device as claimed in claim 13, wherein the two annuli have holes centered about the axis and through which the cable passes, wherein, in its open shape, the central cavity has a cross section perpendicular to the axis that is constant along the axis, and wherein the cross sections of the holes have dimensions smaller than those of the cross section of the central cavity.

* * * * *